(12) United States Patent
Furukawa et al.

(10) Patent No.: US 11,900,920 B2
(45) Date of Patent: Feb. 13, 2024

(54) SOUND PICKUP DEVICE, SOUND PICKUP METHOD, AND NON-TRANSITORY COMPUTER READABLE RECORDING MEDIUM STORING SOUND PICKUP PROGRAM

(71) Applicant: Panasonic Intellectual Property Corporation of America, Torrance, CA (US)

(72) Inventors: Hiroki Furukawa, Osaka (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 218 days.

(21) Appl. No.: 17/098,753

(22) Filed: Nov. 16, 2020

(65) Prior Publication Data

US 2021/0151033 A1    May 20, 2021

Related U.S. Application Data

(60) Provisional application No. 62/936,787, filed on Nov. 18, 2019.

(30) Foreign Application Priority Data

Mar. 13, 2020  (JP) ................................ 2020-043913

(51) Int. Cl.
  *G10L 15/08*  (2006.01)
  *G10L 15/02*  (2006.01)
  (Continued)

(52) U.S. Cl.
  CPC .............. *G10L 15/08* (2013.01); *G10L 15/02* (2013.01); *G10L 25/84* (2013.01); *H04R 29/005* (2013.01);
  (Continued)

(58) Field of Classification Search
  CPC .............. G10L 25/84; G10L 2021/2166; G10L 2021/02166; G10L 15/02; G10L 15/08;
  (Continued)

(56) References Cited

U.S. PATENT DOCUMENTS 7,117,157 B1 *  10/2006  Taylor ...................... G06F 3/167
                                                          704/E15.041
10,867,617 B1 *  12/2020  Nakagawa .......... G10L 21/0224
                  (Continued)

FOREIGN PATENT DOCUMENTS

EP    1 923 866 A1    5/2008
JP       3849116      11/2006
              (Continued)

OTHER PUBLICATIONS

Kobayashi, et al. "An adaptive microphone array using multiple fictitious sources." Electronics and Communications in Japan (Part III: Fundamental Electronic Science) 87.2 (2004): 20-32 (Year: 2004).*

(Continued)

*Primary Examiner* — Jesse S Pullias
*Assistant Examiner* — Michael C. Lee
(74) *Attorney, Agent, or Firm* — Greenblum & Bernstein, P.L.C.

(57) ABSTRACT

A sound pickup device includes a plurality of microphone elements, a sensitivity correcting unit that corrects a difference in sensitivity among the microphone elements by multiplying an output signal of each of the microphone elements by a gain. The sound pickup device also includes a target sound detecting unit that detects a voice of a speaker as a target sound, a sensitivity correction control unit that controls the gain based on a result of detecting the target sound, and a directivity synthesizing unit that picks up the target sound in a boosted manner using the output signals (Continued)

from the microphone elements of which difference in sensitivity is corrected. The sensitivity correction control unit updates the gain based on the output signals from the microphone elements if the voice of the speaker is detected and does not update the gain if the voice of the speaker is not detected.

12 Claims, 11 Drawing Sheets

(51) Int. Cl.
    *G10L 25/84*     (2013.01)
    *H04R 29/00*     (2006.01)
    *G10L 21/0216*     (2013.01)

(52) U.S. Cl.
    CPC ............... *G10L 2021/02166* (2013.01); *H04R 2430/20* (2013.01); *H04R 2430/25* (2013.01)

(58) Field of Classification Search
    CPC ... G10L 25/78; H04R 29/005; H04R 2430/20; H04R 2430/25; H04R 1/406; H04R 29/006; H04R 3/005; H04R 1/08; H04R 3/12; H04R 29/004
    See application file for complete search history.

(56) References Cited

U.S. PATENT DOCUMENTS

| | | | |
|---|---|---|---|
| 11,043,086 B1* | 6/2021 | Daoura | G08B 21/24 |
| 11,107,492 B1* | 8/2021 | Chu | H04R 3/005 |
| 11,164,592 B1* | 11/2021 | Wu | G10L 21/034 |
| 2006/0222184 A1 | 10/2006 | Buck et al. | |
| 2006/0259294 A1* | 11/2006 | Tashereau | G10L 15/02 704/E15.044 |
| 2009/0055170 A1 | 2/2009 | Nagahama | |
| 2011/0301948 A1* | 12/2011 | Chen | G10L 25/78 704/E19.039 |
| 2011/0313763 A1* | 12/2011 | Amada | H04R 3/005 381/92 |
| 2013/0173262 A1* | 7/2013 | Shidoji | G10L 21/0364 704/225 |
| 2016/0064002 A1* | 3/2016 | Kim | G01S 3/8083 704/246 |
| 2018/0027324 A1* | 1/2018 | Kim | H04R 1/326 381/182 |
| 2019/0267022 A1* | 8/2019 | Lombard | H03G 3/002 |
| 2019/0364359 A1* | 11/2019 | Ferguson | H04R 5/04 |
| 2020/0058315 A1* | 2/2020 | Shank | H04R 1/08 |

FOREIGN PATENT DOCUMENTS

| | | |
|---|---|---|
| JP | 2007-129373 A | 5/2007 |
| JP | 4734070 | 7/2011 |
| JP | 5450298 | 3/2014 |

OTHER PUBLICATIONS

Extended European Search Report (EESR), dated Apr. 14, 2021 by the European Patent Office (EPO), for the corresponding European Patent Application No. 20205883.0.

* cited by examiner

SOUND PICKUP DEVICE, SOUND PICKUP METHOD, AND NON-TRANSITORY COMPUTER READABLE RECORDING MEDIUM STORING SOUND PICKUP PROGRAM

FIELD OF THE INVENTION

The present disclosure relates to a technique of picking up a target sound using a plurality of microphone elements.

BACKGROUND ART

Conventionally, a beamformer that controls directionality using output signals from at least two microphone elements is known. A sound pickup device uses the beamformer to suppress a surrounding noise and picks up a target sound separated from the surrounding noise. A variation in sensitivity among at least two microphone elements may deteriorate the noise suppressing performance of the beamformer.

For example, JP 4734070 B2 discloses a beamformer in which a general sidelobe canceller (hereinafter referred to as GSC) is combined with automatic calibration processing. JP 4734070 B2 describes correcting a variation in sensitivity among a plurality of microphones by a surrounding noise.

However, in the conventional technique, the noise suppressing performance in directivity synthesis may be deteriorated, and thus further improvement is yet needed.

SUMMARY OF THE INVENTION

The present disclosure has been made to solve the above-mentioned problem. An object of the present invention is to provide a technique of improving noise suppressing performance in directivity synthesis and picking up a target sound with a high S/N ratio.

A sound pickup device according to one aspect of the present disclosure includes a plurality of microphone elements, a sensitivity correcting unit configured to correct a difference in sensitivity among the plurality of microphone elements by multiplying an output signal of each of the plurality of microphone elements by a gain, a target sound detecting unit configured to detect a voice of a speaker as a target sound, a gain control unit configured to control the gain based on a result of detection by the target sound detecting unit, and a directivity synthesizing unit configured to pick up the target sound that comes along a predetermined direction in a boosted manner using the output signals that are from the plurality of microphone elements and corrected by the sensitivity correcting unit, in which the gain control unit updates the gain based on the output signals from the plurality of microphone elements if the voice of the speaker is detected by the target sound detecting unit and does not update the gain if the voice of the speaker is not detected by the target sound detecting unit.

DESCRIPTION OF EMBODIMENTS

Knowledge Underlying Present Disclosure

Figure 1:
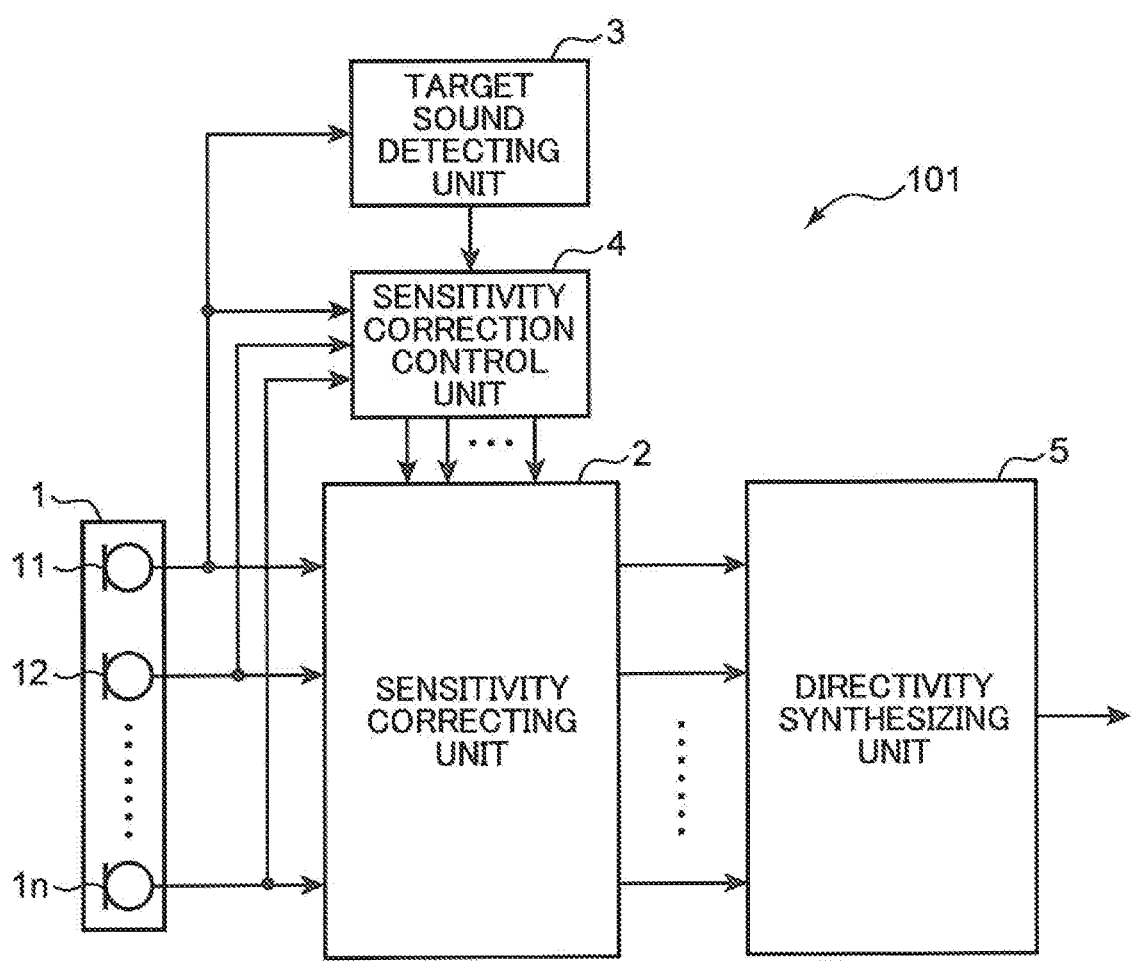
FIG. 1 is a block diagram illustrating a configuration of a sound pickup device according to a first embodiment of the present disclosure.

In a conventional technique as described above, a variation in sensitivity among a plurality of microphones is corrected by a surrounding noise.

When a noise source is close to a microphone array including a plurality of microphone elements, the difference in a distance between the noise source and each of the microphone elements is not negligible, and thus the noise produced by the noise source causes different sound pressures at different positions of the microphone elements. When the noise produced by the noise source close to the microphone array is used for correcting sensitivity or automatic calibration for a plurality of microphone elements, the correction of sensitivity or the automatic calibration cannot be performed correctly. On the contrary, an output performance of a beamformer in a later step may be deteriorated.

In particular, in a GSC, a blocking matrix generates a noise reference signal having a sensitivity dead angle toward a target sound direction. But if there is a variation in sensitivity among the plurality of microphone elements, the sensitivity dead angle is not created toward the target sound direction, and thus the target sound filters into the noise reference signal. In such a case, the noise reference signal, which the target sound has filtered into via adaptive noise cancelling in a later step, is subtracted from an output of a weighted sum beamformer, and this may distort the target sound in an output signal. To prevent the target sound from filtering into the noise reference signal, at least the sensitivity of the plurality of microphone elements should be leveled.

To solve the abovementioned problem, a sound pickup device according to one aspect of the present disclosure includes a plurality of microphone elements, a sensitivity correcting unit configured to correct a difference in sensitivity among the plurality of microphone elements by multiplying an output signal of each of the plurality of microphone elements by a gain, a target sound detecting unit configured to detect a voice of a speaker as a target sound, a gain control unit configured to control the gain based on a result of detection by the target sound detecting unit, and a directivity synthesizing unit configured to pick up the target sound that comes along a predetermined direction in a boosted manner using the output signals that are from the plurality of microphone elements and corrected by the sensitivity correcting unit, in which the gain control unit updates the gain based on the output signals from the plurality of microphone elements if the voice of the speaker is detected by the target sound detecting unit and does not update the gain if the voice of the speaker is not detected by the target sound detecting unit.

In this configuration, the output signals from the plurality of microphone elements are each multiplied by the gain to correct the difference in sensitivity among the plurality of microphone elements. The gain is updated based on the output signals from the plurality of microphone elements if the voice of the speaker is detected, and not updated if the voice of the speaker is not detected. Using the output signals from the plurality of microphone elements of which sensitivities are corrected, the target sound coming along the predetermined direction is picked up in a boosted manner.

Since the gain is updated to correct the difference in sensitivity among the plurality of microphone elements if the voice of the speaker, which is the target sound, is detected, the difference in sensitivity to the target sound among the plurality of microphone elements can be corrected. This enables reducing an amount of the target sound filtering, in the directivity synthesis in the later step, into the noise reference signal that has a sensitivity dead angle toward the target sound direction. Accordingly, the noise suppressing performance in the directivity synthesis can be improved and the target sound can be picked up with a high SN ratio.

In this sound pickup device, the target sound detecting unit may include a voice determining unit configured to determine whether an output signal from one microphone element among the plurality of microphone elements is the voice or a non-voice which is not the voice.

In this configuration, it is determined whether the output signal from one of the plurality of microphone elements is a voice or a non-voice, and thus the voice of the speaker can easily be detected.

In this sound pickup device, the target sound detecting unit may include a first extracting unit configured to extract a signal of a particular band from the output signal from the one microphone element, and the voice determining unit may determine whether the signal extracted by the first extracting unit is the voice or the non-voice.

In this configuration, it is determined whether the sound is a voice or a non-voice for the signal, of the particular band, extracted from the output signal from one microphone element, and thus the voice of the speaker can be detected with higher accuracy.

In this sound pickup device, the target sound detecting unit may include a target sound direction determining unit configured to determine whether the target sound comes along a predetermined target sound direction using the output signals from the plurality of microphone elements, and a target sound determining unit configured to determine that the target sound is detected if the target sound direction determining unit determines that the target sound comes along the target sound direction and the voice determining unit determines that the output signal from the one microphone element is the voice.

If determination is made only on whether a voice is detected, it may be determined that a voice is detected even when utterance is made along a direction which is not the target sound direction. In this configuration, it is determined that the target sound is detected and the gain is updated only if a voice is detected and the target sound comes along the target sound direction. Thus, the difference in sensitivity can be corrected with higher accuracy using the target sound.

In this sound pickup device, the target sound detecting unit may include a second extracting unit configured to extract a signal of a particular band from the output signals from the plurality of microphone elements, and the target sound direction determining unit may determine whether the target sound comes along the target sound direction for the signal extracted by the second extracting unit.

In this configuration, it is determined whether the target sound comes along the target sound direction for the signal, of the particular band, extracted from the output signals from the plurality of microphone elements. Thus, whether the target sound comes along the target sound direction can be determined with higher accuracy.

In this sound pickup device, the target sound direction determining unit may include a direction estimating unit configured to estimate a direction along which the target sound comes using a phase difference among the output signals from the plurality of microphone elements, and a direction determining unit configured to determine whether the direction estimated by the direction estimating unit is the target sound direction which has previously been determined.

The direction along which the target sound comes can easily be estimated using the phase difference among the output signals of the plurality of microphone elements. Thus, if the target sound direction is previously known, whether the target sound comes along the target sound direction can easily be determined based on the estimated direction along which the target sound comes.

In this sound pickup device, the target sound direction determining unit may include a first directivity synthesizing unit configured to form a directivity along the target sound direction by boosting a signal that comes along the target sound direction using the output signals from the plurality of microphone elements, a second directivity synthesizing unit configured to form a sensitivity dead angle toward the target sound direction using the output signals from the plurality of microphone elements, and a level comparison determining unit configured to compare an output level of an output signal from the first directivity synthesizing unit with an output level of an output signal from the second directivity synthesizing unit and determine whether the target sound comes along the target sound direction.

When the target sound comes along the target sound direction, the output signal level of the first directivity synthesizing unit is larger than the output signal level of the second directivity synthesizing unit. Thus, if the output signal level of the first directivity synthesizing unit is larger than the output signal level of the second directivity synthesizing unit, it can be determined that the target sound comes along the target sound direction. If the target sound comes not along the target sound direction, the output signals of the first directivity synthesizing unit and the second directivity synthesizing unit include only a surrounding noise. Accordingly, the output signal level of the first directivity synthesizing unit is almost equal to the output signal level of the second directivity synthesizing unit, or is smaller than the output signal level of the second directivity synthesizing unit. Thus, if the output signal level of the first directivity synthesizing unit is equal to or smaller than the output signal level of the second directivity synthesizing unit, it can be determined that the target sound comes not along the target sound direction.

In this sound pickup device, the gain control unit may include a level detecting unit configured to detect an output level of an output signal from each of the plurality of microphone elements, a time average level calculating unit configured to calculate a time average level of the output level detected by the level detecting unit if the voice of the speaker is detected by the target sound detecting unit, and a correction gain calculating unit configured to calculate a correction gain from the time average level calculated by the time average level calculating unit, the correction gain resulting from updating the gain.

In this configuration, the time average level of the output level of the output signal of each of the plurality of microphone elements is calculated if the voice of the speaker is detected. Since the correction gain resulting from updating the gain is calculated from the calculated time average level, the difference in sensitivity among the plurality of microphone elements can be corrected by multiplying the output signal of each of the plurality of microphone elements by the correction gain.

In this sound pickup device, the correction gain calculating unit may be configured to calculate the correction gain of each of the plurality of microphone elements except a previously designated microphone element using the time average level of the previously designated microphone element as a reference so that the time average level of each of the plurality of microphone elements except the previously designated microphone element are leveled to the time average level of the previously designated microphone element.

In this configuration, the difference in sensitivity among the plurality of microphone elements is corrected so as to level the output levels of the plurality of microphone elements except the previously designated microphone elements to the output level of the previously designated microphone element.

In this sound pickup device, the correction gain calculating unit may be configured to calculate the correction gain of each of the plurality of microphone elements using an average of the time average levels of at least two previously designated microphone elements among the plurality of microphone elements as a reference so that the time average levels of the plurality of microphone elements are leveled to the average of the time average levels of the at least two microphone elements.

In this configuration, the difference in sensitivity among the plurality of microphone elements is corrected so as to level the output levels of the plurality of microphone elements to the average of the output levels of at least two previously designated microphone elements among the plurality of microphone elements.

In this sound pickup device, the gain control unit may include a third extracting unit configured to extract a signal of a particular band from the output signal from each of the plurality of microphone elements, and the level detecting unit may detect output levels of the signals extracted by the third extracting unit.

In this configuration, the output level of the signal, of the particular band, extracted from the output signal of each of the plurality of microphone elements is detected, so that the effect of the noise, which is not the target sound, can be reduced.

In this sound pickup device, the particular band may be from 200 Hz to 500 Hz.

In this configuration, the output level of the signal, of the band from 200 Hz to 500 Hz, extracted from the output signal from each of the plurality of microphone elements is detected. By eliminating the low band noise of 200 Hz or lower, the effect by the low band noise is reduced. Furthermore, by eliminating the band of 500 Hz or higher, the sound only has wave lengths sufficiently longer than the size of the microphone array, and thus the difference in sound pressure among the microphone elements constituting the microphone array and provided at different locations is reduced. This enables correcting sensitivity with high accuracy.

A sound pickup method according to another aspect of the present disclosure is performed by a computer and includes correcting a difference in sensitivity among a plurality of microphone elements by multiplying an output signal of each of the plurality of microphone elements by a gain, detecting a voice of a speaker as a target sound, controlling the gain based on a result of detecting the target sound, and picking up the target sound in a boosted manner using the output signals that are from the plurality of microphone elements and corrected, the target sound coming along a predetermined direction, in which the controlling the gain is performed such that the gain is updated based on the output signals from the plurality of microphone elements if the voice of the speaker is detected and the gain is not updated if the voice of the speaker is not detected.

In this configuration, the output signals from the plurality of microphone elements are each multiplied by the gain to correct the difference in sensitivity among the plurality of microphone elements. The gain is updated based on the output signals from the plurality of microphone elements if the voice of the speaker is detected, and not updated if the voice of the speaker is not detected. Using the output signals from the plurality of microphone elements of which sensitivities are corrected, the target sound coming along the predetermined direction is picked up in a boosted manner.

Since the gain is updated to correct the difference in sensitivity among the plurality of microphone elements if the voice of the speaker, which is the target sound, is detected, the difference in sensitivity to the target sound among the plurality of microphone elements can be corrected. This enables reducing an amount of the target sound filtering, in the directivity synthesis in the later step, into the noise reference signal that has a sensitivity dead angle toward the target sound direction. Accordingly, the noise suppressing performance in the directivity synthesis can be improved and the target sound can be picked up with a high S/N ratio.

A non-transitory computer readable recording medium storing a sound pickup program according to another aspect of the present disclosure causes a computer to function as a sensitivity correcting unit configured to correct a difference in sensitivity among a plurality of microphone elements by multiplying an output signal of each of the plurality of microphone elements by a gain, a target sound detecting unit configured to detect a voice of a speaker as a target sound, a gain control unit configured to control the gain based on a result of detection by the target sound detecting unit, and a directivity synthesizing unit configured to pick up the target sound in a boosted manner using the output signals which are from the plurality of microphone elements and corrected by the sensitivity correcting unit, the target sound coming along a predetermined direction, in which the gain control unit updates the gain based on the output signals from the plurality of microphone elements if the voice of the speaker is detected by the target sound detecting unit and does not update the gain if the voice of the speaker is not detected by the target sound detecting unit.

In this configuration, the output signals from the plurality of microphone elements are each multiplied by the gain to correct the difference in sensitivity among the plurality of microphone elements. The gain is updated based on the output signals from the plurality of microphone elements if the voice of the speaker is detected, and not updated if the voice of the speaker is not detected. Using the output signals from the plurality of microphone elements of which sensitivities are corrected, the target sound coming along the predetermined direction is picked up in a boosted manner.

Since the gain is updated to correct the difference in sensitivity among the plurality of microphone elements if the voice of the speaker, which is the target sound, is detected, the difference in sensitivity to the target sound among the plurality of microphone elements can be corrected. This enables reducing an amount of the target sound filtering, in the directivity synthesis in the later step, into the noise reference signal that has a sensitivity dead angle toward the target sound direction. Accordingly, the noise suppressing performance in the directivity synthesis can be improved and the target sound can be picked up with a high SN ratio.

Embodiments of the present disclosure will now be described in detail with reference to the drawings. The embodiments described below are examples embodying the present disclosure and thus do not limit the technical scope of the present disclosure.

First Embodiment

FIG. 1 is a block diagram illustrating a configuration of a sound pickup device 101 according to a first embodiment of the present disclosure.

The sound pickup device 101 illustrated in FIG. 1 includes a microphone array 1, a sensitivity correcting unit 2, a target sound detecting unit 3, a sensitivity correction control unit (gain control unit) 4, and a directivity synthesizing unit 5.

The microphone array 1 includes n microphone elements (n is a natural number) which are microphone elements 11, 12, . . . , and 1n that convert an acoustic signal into an electric signal.

Figure 2:
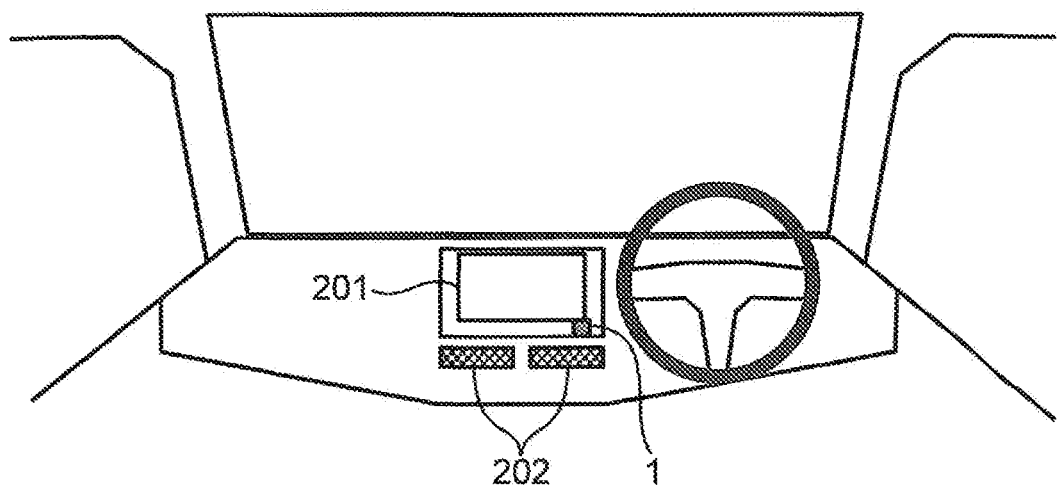
FIG. 2 illustrates an example arrangement of a microphone array according to the first embodiment of the present disclosure.
Figure 3:
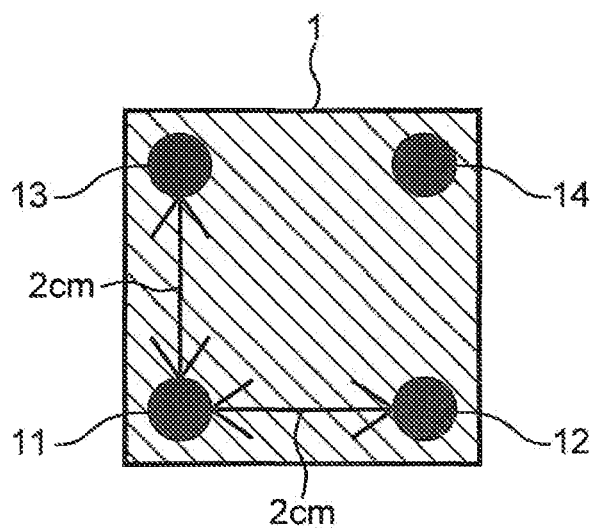
FIG. 3 is an example arrangement of microphone elements of the microphone array according to the first embodiment of the present disclosure.

FIG. 2 illustrates an example arrangement of the microphone array 1 of the first embodiment of the present disclosure. FIG. 3 is an example arrangement of the microphone elements 11, 12, . . . , 1n of the microphone array 1 of the first embodiment of the present disclosure.

As illustrated in FIG. 2, the microphone array 1 of the first embodiment is disposed close to a display 201 in a vehicle. The display 201 is one of components constituting a car navigation system. An outlet 202 of an air conditioner is provided below the display 201. Cooled air or warm air flows out from the outlet 202.

The microphone array 1 illustrated in FIG. 3 includes, for example, four microphone elements 11, 12, 13, and 14. The microphone elements 11, 12, 13, and 14 are disposed on four corners of a square substrate. A horizontal distance between the microphone elements 11 and 12 disposed on a lower portion of the substrate is, for example, 2 cm. A horizontal distance between the microphone elements 13 and 14 disposed on an upper portion of the substrate is, for example, 2 cm. A vertical distance between the microphone elements 11 and 13 is, for example, 2 cm, and a vertical distance between the microphone elements 12 and 14 is, for example, 2 cm.

A distance between the microphone array 1 and the outlet 202 is, for example, 2 cm. The microphone array 1 obtains a voice of a speaker seated in a driver's seat as a target sound. A sound of air flowing out of the outlet 202 is included in the target sound as a noise. The distance between the outlet 202 and the microphone element 13 that is closest to the outlet 202 is 2 cm, and the distance between the outlet 202 and the microphone element 11 that is farthest from the outlet 202 is 4 cm. The distance between the microphone element 11 and the outlet 202 is twice the distance between the microphone element 13 and the outlet 202.

The difference between the distance from the outlet 202, which is a noise source, to the microphone element 11 and the distance from the outlet 202 to the microphone element 13 is not negligible, and the noise produced by the outlet 202 causes a difference in sound pressure among the locations of the microphone elements 11 and 13. Correction of sensitivity cannot be performed correctly for the microphone elements 11 to 14 using the noise produced by such a noise source that is close to the microphone array 1. On the contrary, the noise may deteriorate the output performance of the directivity synthesizing unit (beamformer) in a later step. Thus, the sound pickup device 101 according to the first embodiment performs correction of sensitivity for the microphone elements 11 to 14 using the target sound.

The number of microphone elements included in the microphone array 1 is not limited to four. The arrangement of the plurality of microphone elements is not limited to the arrangement illustrated in FIG. 3.

Among the microphone elements 11, 12, . . . , and 1n, an output signal from the microphone element 11 is input to the target sound detecting unit 3. The output signals from the microphone elements 11, 12, . . . , and 1n are input to the sensitivity correcting unit 2 and the sensitivity correction control unit 4.

The sensitivity correcting unit 2 multiplies each of the output signals from the plurality of microphone elements 11, 12, . . . , and 1n by a gain to correct the difference in sensitivity among the plurality of microphone elements 11, 12, . . . , and 1n. The sensitivity correcting unit 2 multiplies each of the output signals from the microphone elements 11, 12, . . . , and 1n by a designated gain to correct variation in sensitivity among the microphone elements 11, 12, . . . , and 1n. The sensitivity correcting unit 2 levels the sensitivity of the plurality of microphone elements 11, 12, . . . , and 1n.

The target sound detecting unit 3 detects a voice of the speaker as the target sound. The target sound detecting unit 3 obtains the output signal from the microphone element 11, among the microphone elements 11, 12, . . . , and 1n, and checks whether the target sound exists in the sound picked up by the microphone array 1. Although, in the first embodiment, the target sound detecting unit 3 checks whether the target sound exists from the output signal from the microphone element 11, the present disclosure is not limited to such a configuration. The target sound detecting unit 3 may check whether the target sound exists from the output signal from any one of the microphone elements 11, 12, . . . , and 1n.

A configuration of the target sound detecting unit 3 will be described further in detail using FIGS. 4 and 5.

The sensitivity correction control unit 4 controls the gain based on the result of detection by the target sound detecting unit 3. The sensitivity correction control unit 4 obtains the output signals from the microphone elements 11, 12, ..., and 1n and calculates, if the target sound is detected by the target sound detecting unit 3, sensitivity correction gains for the output signals from the microphone elements 11, 12, ..., and 1n to be used in the sensitivity correcting unit 2.

The sensitivity correction control unit 4 updates the gains based on the output signals from the plurality of microphone elements 11, 12, ..., and 1n if the voice of the speaker is detected by the target sound detecting unit 3 and does not update the gain if the voice of the speaker is not detected by the target sound detecting unit 3. A configuration of the sensitivity correction control unit 4 will be described further in detail using FIG. 6.

The directivity synthesizing unit (beamformer) 5 picks up the target sound coming along the predetermined direction in a boosted manner using the output signals which are from the plurality of microphone elements 11, 12, ..., and 1n and corrected by the sensitivity correcting unit 2. The directivity synthesizing unit 5 obtains the output signals which are from the microphone elements 11, 12, ..., and 1n and corrected by the sensitivity correcting unit 2 and improves the S/N ratio of the target sound.

A configuration of the target sound detecting unit 3 illustrated in FIG. 1 will further be described.

Figure 4:
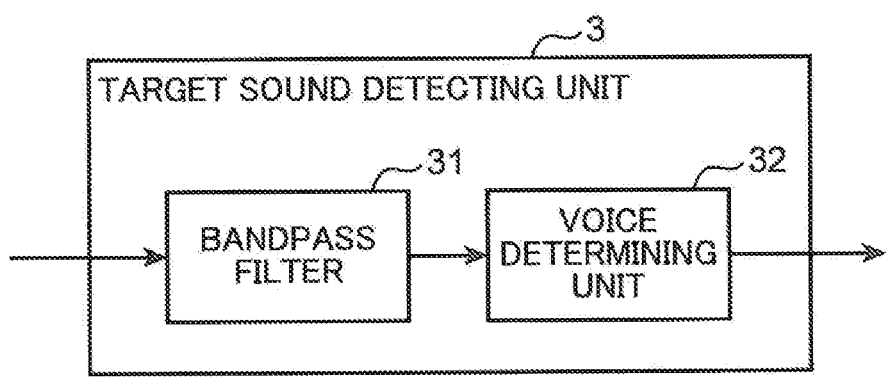
FIG. 4 is a block diagram illustrating a configuration of a target sound detecting unit of the sound pickup device according to the first embodiment of the present disclosure.

FIG. 4 is a block diagram illustrating a configuration of the target sound detecting unit 3 of the sound pickup device 101 according to the first embodiment of the present disclosure.

The target sound detecting unit 3 illustrated in FIG. 4 includes a bandpass filter (first extracting unit) 31, and the voice determining unit 32.

The bandpass filter 31 extracts a signal of a particular band from the output signal from the microphone element 11 among the plurality of microphone elements 11, 12, ..., and 1n. The bandpass filter 31 extracts a signal of a band of, for example, 200 Hz to 500 Hz from the output signal from the microphone element 11. The bandpass filter 31 extracts from the output signal from the microphone element 11 a signal of a band from which a voice uttered by a person can be extracted.

The voice determining unit 32 determines whether the output signal from the microphone element 11, among the plurality of microphone elements 11, 12, ..., and 1n, is a voice or a non-voice which is a non-vocal sound. The voice determining unit 32 determines whether the signal extracted by the bandpass filter 31 is a voice or a non-voice.

A configuration of the voice determining unit 32 illustrated in FIG. 4 will further be described.

Figure 5:
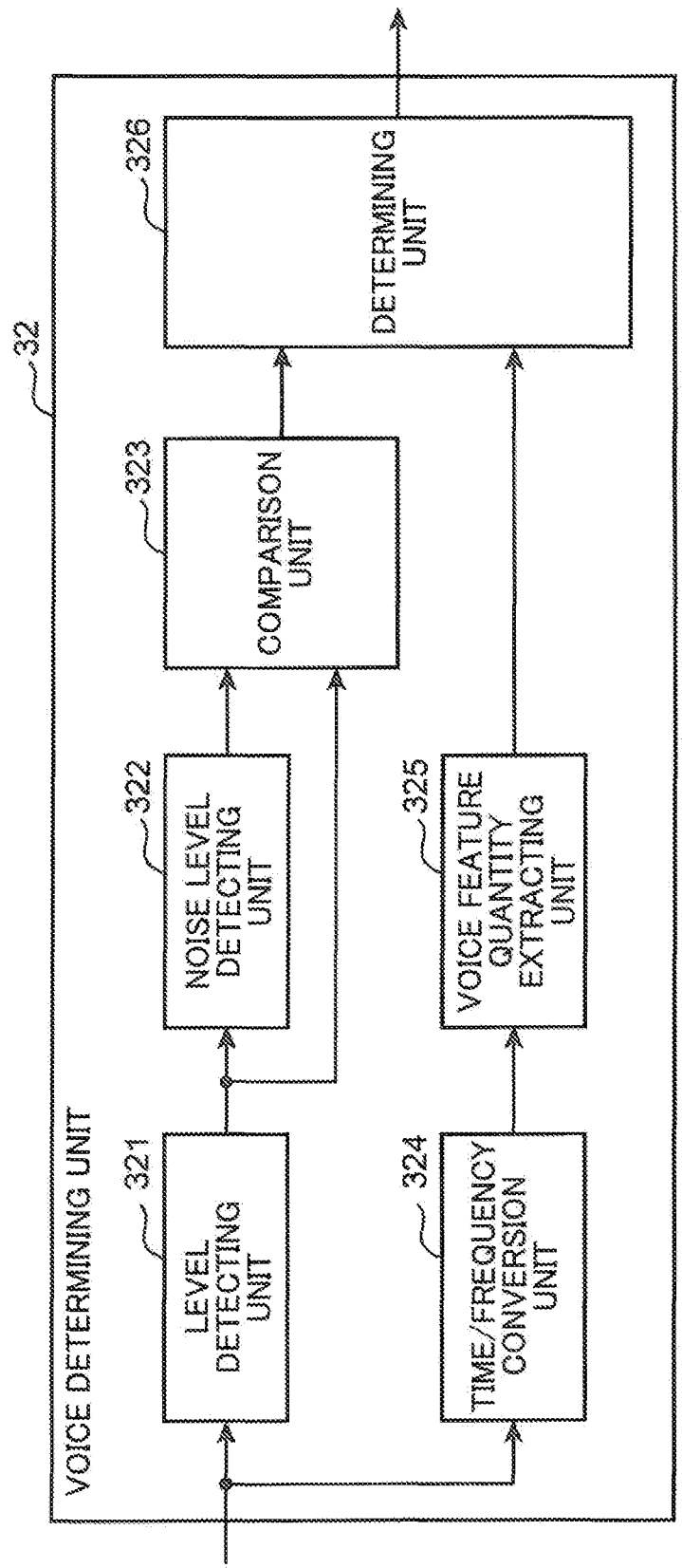
FIG. 5 is a block diagram illustrating a configuration of a voice determining unit of the sound pickup device according to the first embodiment of the present disclosure.

FIG. 5 is a block diagram illustrating a configuration of the voice determining unit 32 of the sound pickup device 101 according to the first embodiment of the present disclosure.

The voice determining unit 32 includes a level detecting unit 321, a noise level detecting unit 322, a comparison unit 323, a time-frequency conversion unit 324, a voice feature quantity extracting unit 325, and a determining unit 326.

The level detecting unit 321 detects a signal level of the output signal from the microphone element 11.

The noise level detecting unit 322 detects a noise level by holding a minimum value of the signal level detected by the level detecting unit 321.

The comparison unit 323 compares the output of the level detecting unit 321 with the output of the noise level detecting unit 322 to determine whether a voice exists from the waveform. For example, the comparison unit 323 sets a value twice the noise level detected by the noise level detecting unit 322 as a threshold. The comparison unit 323 determines whether the signal level detected by the level detecting unit 321 is equal to or higher than the threshold. If the signal level detected by the level detecting unit 321 is equal to or higher than the threshold, the comparison unit 323 determines that a voice is included in the output signal from the microphone element 11. If the signal level detected by the level detecting unit 321 is lower than the threshold, the comparison unit 323 determines that a voice is not included in the output signal from the microphone element 11.

The time-frequency conversion unit 324 converts the output signal in a time domain of the microphone element 11 into an output signal in a frequency domain.

The voice feature quantity extracting unit 325 extracts a voice feature quantity from the output signal in the frequency domain. The voice feature quantity is a feature quantity indicating a voice. The voice feature quantity extracting unit 325 may employ a method of extracting a voice feature quantity using a voice pitch as described in JP 5450298 B2 or a method of extracting a voice feature quantity using a feature of a harmonic structure as a feature quantity as described in JP 3849116 B2. When the sound pickup device 101 is mounted in a vehicle, the microphone array 1 is assembled near the display 201 installed in a console as illustrated in FIG. 2. In this case, the outlet 202 of the air conditioner is the noise source. Since a noise has a relatively monotone spectrum, the voice feature quantity extracting unit 325 may extract an alternating component of an amplitude spectrum or a ratio of peak to dip of an amplitude spectrum as a voice feature quantity. In this manner, it can be determined whether the sound produced by the outlet 202 of the air conditioner is a noise or a voice.

If the comparison unit 323 determines that a voice is included in the output signal from the microphone element 11 and the voice feature quantity extracting unit 325 extracts a voice feature quantity from the output signal from the microphone element 11, the determining unit 326 determines that the output signal from the microphone element 11 is a voice. If the comparison unit 323 determines that a voice is not included in the output signal from the microphone element 11 or if the voice feature quantity extracting unit 325 does not extract a voice feature quantity from the output signal from the microphone element 11, the determining unit 326 determines that the output signal from the microphone element 11 is a non-voice. The determining unit 326 outputs a determined result signal Odet(j) indicating a voice or a non-voice to the sensitivity correction control unit 4. Note that j indicates a sample number corresponding to a time.

As a result, if it is determined that the output signal from the microphone element 11 is a voice, the target sound detecting unit 3 outputs the determined result signal Odet(j)=1, and if it is determined that the output signal from the microphone element 11 is a non-voice, the target sound detecting unit 3 outputs the determined result signal Odet(j)=0.

A configuration of the sensitivity correction control unit 4 illustrated in FIG. 1 will further be described.

Figure 6:
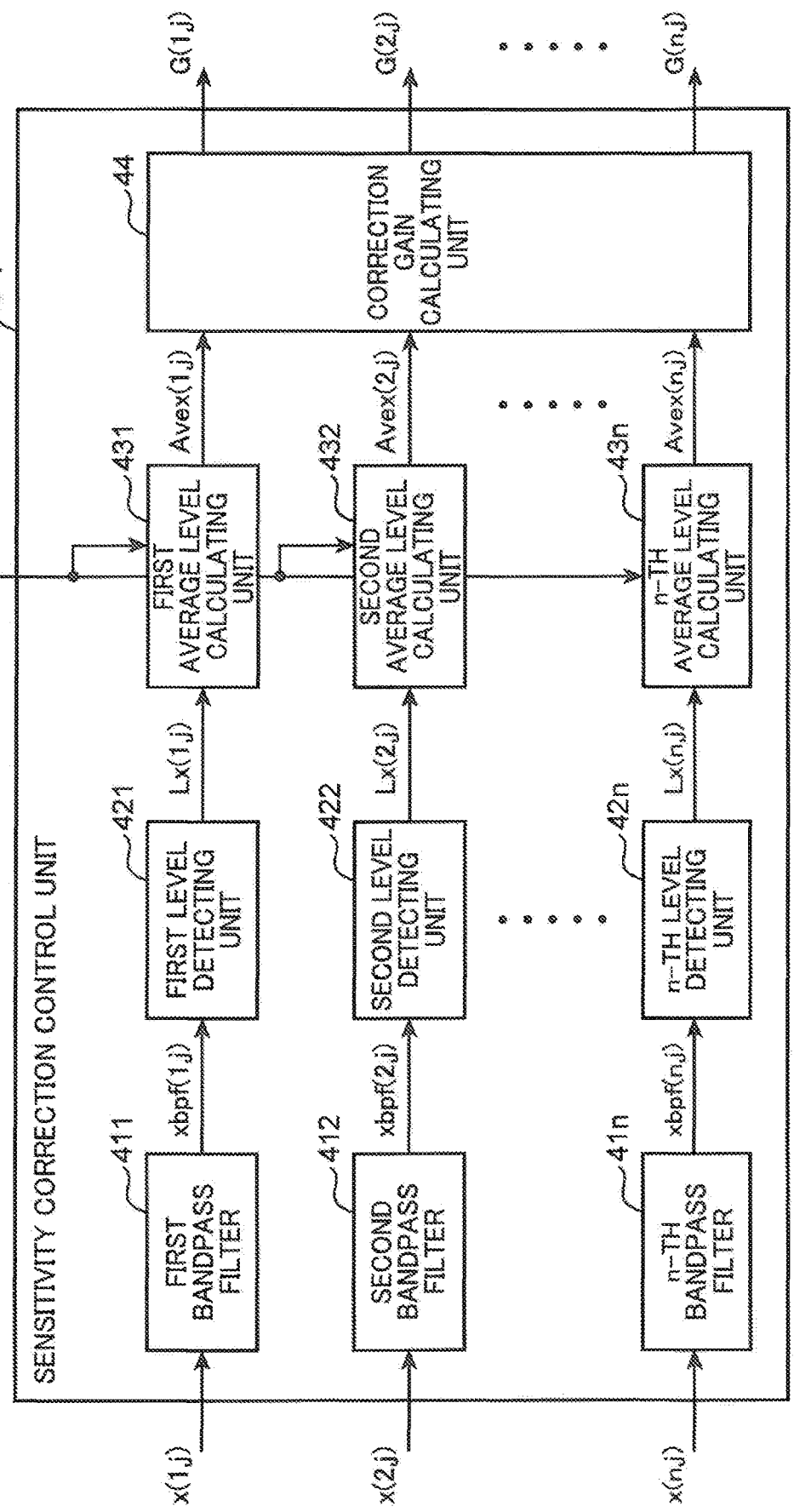
FIG. 6 is a block diagram illustrating a configuration of a sensitivity correction control unit of the sound pickup device according to the first embodiment of the present disclosure.

FIG. 6 is a block diagram illustrating a configuration of the sensitivity correction control unit 4 of the sound pickup device 101 according to the first embodiment of the present disclosure.

The sensitivity correction control unit 4 includes first to n-th bandpass filters (third extracting units) 411 to 41n, first to n-th level detecting units 421 to 42n, first to n-th average level calculating units (time average level calculating units) 431 to 43n, and a correction gain calculating unit 44. The first to n-th bandpass filters 411 to 41n, the first to n-th level detecting units 421 to 42n, and the first to n-th average level calculating units 431 to 43n are provided according to the number of the microphone elements 11 to 1n. For example, the output signal x(1, j) from the microphone element 11 is input to the first bandpass filter 411.

The first to n-th bandpass filters 411 to 41n respectively extract signals of a particular band from the output signals from the plurality of microphone elements 11 to 1n. The particular band is from 200 Hz to 500 Hz.

The first to n-th level detecting units 421 to 42n respectively detect the output levels of the output signals from the plurality of microphone elements 11 to 1n.

The first to n-th level detecting units 421 to 42n each detects the output level Lx(i, j) of the output signal x(i, j) from the microphone element using a general amplitude smoothing equation (1) expressed below.

$$Lx(i,j)=\text{beta1}\cdot |x(i,j)|+(1-\text{beta1})\cdot Lx(i,j-1) \tag{1}$$

In the equation (1), i indicates a microphone element number and j indicates a sample number corresponding to a time. In the equation (1), beta1 indicates a weighting coefficient which is a parameter for determining an averaging speed.

In the first embodiment, output signals xbpf(i, j) that have passed the first to n-th bandpass filters 411 to 41n are input to the first to n-th level detecting units 421 to 42n. Thus, the first to n-th level detecting units 421 to 42n respectively detect the output levels Lx(i, j) of the output signals xbpf(i, j), which are from the microphone elements 11, 12, . . . , and 1n and extracted by the first to n-th bandpass filters 411 to 41n, using a general amplitude smoothing equation (2) expressed below.

$$Lx(i,j)=\text{beta1}\cdot |xbp(i,j)|+(1-\text{beta1})\cdot Lx(i,j-1) \tag{2}$$

If the target sound detecting unit 3 detects a voice of the speaker, the first to n-th average level calculating units 431 to 43n respectively calculate time average levels Avex(i, j) of the output levels Lx(i, j) detected by the first to n-th level detecting units 421 to 42n.

The first to n-th average level calculating units 431 to 43n each calculate a long-time average (time average level Avex(i, j)) of the output level Lx(i, j) of the microphone element using an equation (3) expressed below only for a time period in which the target sound detecting unit 3 detects the target sound (determined result signal Odet(j)=1). The first to n-th average level calculating units 431 to 43n each calculate the time average level Avex(i, j) for a time period in which the target sound detecting unit 3 does not detect the target sound (determined result signal Odet(j)=0) using an equation (4) expressed below. That is, if the target sound detecting unit 3 does not detect a voice of the speaker, the first to n-th average level calculating units 431 to 43n each sets the time average level Avex(i, j−1) obtained by the previous calculation as the present time average level Avex(i, j).

$$\text{Avex}(i,j)=\text{beta2}\cdot |Lx(i,j)|+(1-\text{beta2})\cdot \text{Avex}(i,j-1) \text{ if } O\text{det}(j)=1 \tag{3}$$

$$\text{Avex}(i,j)=\text{Avex}(i,j-1) \text{ if } O\text{det}(j)=0 \tag{4}$$

In the equation (3) and the equation (4), i indicates the microphone element number and j indicates a sample number corresponding to a time. In the equation (3), beta2 is a weighting coefficient which is a parameter for determining an averaging speed. Here, beta 1 » beta 2. For example, when the sampling frequency is 16 Hz, beta1 is set to 0.000625 to obtain an average level for 100 milliseconds and beta2 is set to 0.0000125 to obtain an average for 5 seconds.

The sensitivity correction gain can correctly be calculated using the long-time average level as the average signal level used for correcting sensitivity of the microphone element.

The correction gain calculating unit 44 calculates sensitivity correction gains by updating the gains from the time average levels calculated by the first to n-th average level calculating units 431 to 43n.

The correction gain calculating unit 44 calculates the sensitivity correction gains of the microphone elements 12 to 1n using the time average level of the microphone element 11 previously designated among the plurality of microphone elements 11 to 1n as a reference so that the time average levels of the microphone elements 12 to 1n are leveled to the time average level of the microphone element 11. That is, the correction gain calculating unit 44 calculates sensitivity correction gains G(i, j) from an equation (5) expressed below using the time average levels Avex(i, j) of the microphone elements 11 to 1n calculated by the first to n-th average level calculating units 431 to 43n and the time average level Avex(1, j) of the microphone element 11.

$$G(i,j)=\text{Avex}(1,j)/\text{Avex}(i,j) \tag{5}$$

When the sensitivity correction gains obtained by the equation (5) are used, sensitivity is corrected using the microphone element 11 as a reference to level the output levels of the microphone elements 12 to 1n.

Although the correction gain calculating unit 44 calculates the sensitivity correction gains using the time average level of the previously designated microphone element 11 as a reference in the equation (5), the present disclosure is not limited to such a method. The correction gain calculating unit 44 may calculate the sensitivity correction gains using the time average level of a microphone element other than the microphone element 11 as a reference.

Furthermore, the correction gain calculating unit 44 may calculate the sensitivity correction gains of the plurality of microphone elements 11 to 1n using an average of the time average levels of at least two previously designated microphone elements among the plurality of microphone elements 11 to 1n as a reference so that the time average levels of the plurality of microphone elements 11 to 1n are leveled to the average of the time average levels of the two microphone elements. That is, the correction gain calculating unit 44 may calculate the sensitivity correction gains G(i, j) from an equation (6) expressed below using the time average levels Avex(i, j) of the microphone elements 11 to 1n calculated by the first to n-th average level calculating units 431 to 43n and the average of the time average levels Avex(i, j).

$$G(i,j)=\{\text{Avex}(1,j)+\text{Avex}(2,j)+\ldots+\text{Avex}(n,j)\}/n/\text{Avex}(i,j) \tag{6}$$

Although the correction gain calculating unit 44 calculates the sensitivity correction gains using the average of the time average levels of all the microphone elements 11 to 1n as a reference in the equation (6), the present disclosure is not limited to such a method. The correction gain calculating unit 44 may calculate the sensitivity correction gains using the average of the time average levels of at least two microphone elements among the microphone elements 11 to 1n as a reference.

For each of the microphone elements 11 to 1n, the sensitivity correcting unit 2 multiplies the output signal x(i, j) by the corresponding sensitivity correction gain G(i, j) calculated by the sensitivity correction control unit 4 to correct the sensitivity.

The directivity synthesizing unit 5 performs directivity synthesis (beam forming) by the GSC described in JP 4734070 B2 using the output signal corrected by the sensitivity correcting unit 2, which are G(i, j)·x(i, j). The directivity synthesizing unit 5 may perform beam forming by known beam forming processing other than the GSC, for example, the maximum likelihood method or the minimum variance method.

An operation of the sound pickup device 101 according to the first embodiment of the present disclosure will be described.

Figure 7:
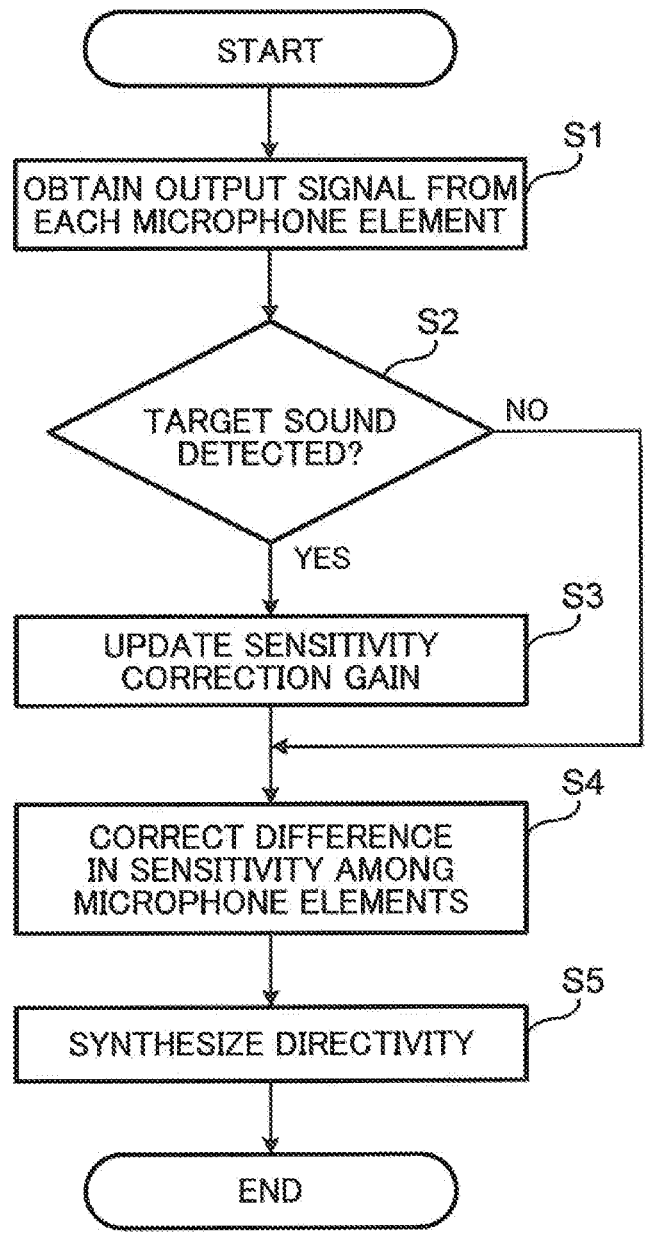
FIG. 7 is a flowchart for explaining an operation of the sound pickup device according to the first embodiment of the present disclosure.

FIG. 7 is a flowchart for explaining an operation of the sound pickup device 101 according to the first embodiment of the present disclosure.

In step S1, the target sound detecting unit 3 obtains the output signal from the microphone element 11, and the sensitivity correcting unit 2 and the sensitivity correction control unit 4 obtain the output signals from the microphone elements 11 to 1n.

In step S2, the target sound detecting unit 3 determines whether the target sound (voice) is detected in the output signal from the microphone element 11. The target sound detecting unit 3 outputs the determined result signal to the sensitivity correction control unit 4, the determined result signal indicating whether the target sound is detected in the output signal from the microphone element 11.

If it is determined that the target sound is detected in the output signal from the microphone element 11 (YES in step S2), the sensitivity correction control unit 4 updates the sensitivity correction gains in step S3 based on the output signals from the plurality of microphone elements 11 to 1n.

If it is determined that the target sound is not detected in the output signal from the microphone element 11 (NO in step S2), the sensitivity correction gains are not updated, and the process proceeds to step S4.

In step S4, the sensitivity correcting unit 2 multiplies each of the output signals from the microphone elements 11 to 1n by the sensitivity correction gain to correct the difference in sensitivity among the microphone elements 11 to 1n.

In step S5, the directivity synthesizing unit 5 synthesizes the directivity using the output signals which are from the microphone elements 11 to 1n and corrected by the sensitivity correcting unit 2. By synthesizing the directivity, the target sound coming along a predetermined direction is picked up in a boosted manner.

As described above, the difference in sensitivity among the plurality of microphone elements 11 to 1n is corrected by multiplying the output signal of each of the microphone elements 11 to 1n by the gain. The gain is updated based on the output signals from the plurality of microphone elements 11 to 1n if a voice of the speaker is detected, and not updated if a voice of the speaker is not detected. Using the output signals from the plurality of microphone elements 11 to 1n of which sensitivities are corrected, the target sound coming along the predetermined direction is picked up in a boosted manner.

Since the gain is updated to correct the difference in sensitivity among the plurality of microphone elements 11 to 1n if a voice of the speaker, which is the target sound, is detected, the difference in sensitivity to the target sound among the microphone elements 11 to 1n can be corrected. This enables reducing an amount of the target sound filtering, in the directivity synthesis in the later step, into the noise reference signal that has a sensitivity dead angle toward the target sound direction. Accordingly, the noise suppressing performance in the directivity synthesis can be improved and the target sound can be picked up with a high S/N ratio.

Second Embodiment

In the first embodiment, the target sound detecting unit 3 determines whether the output signal from one of the microphone elements is a voice or a non-voice. In contrast, in the second embodiment, the target sound detecting unit additionally determines whether the target sound comes along a predetermined target sound direction using the output signals from the plurality of microphone elements.

Figure 8:
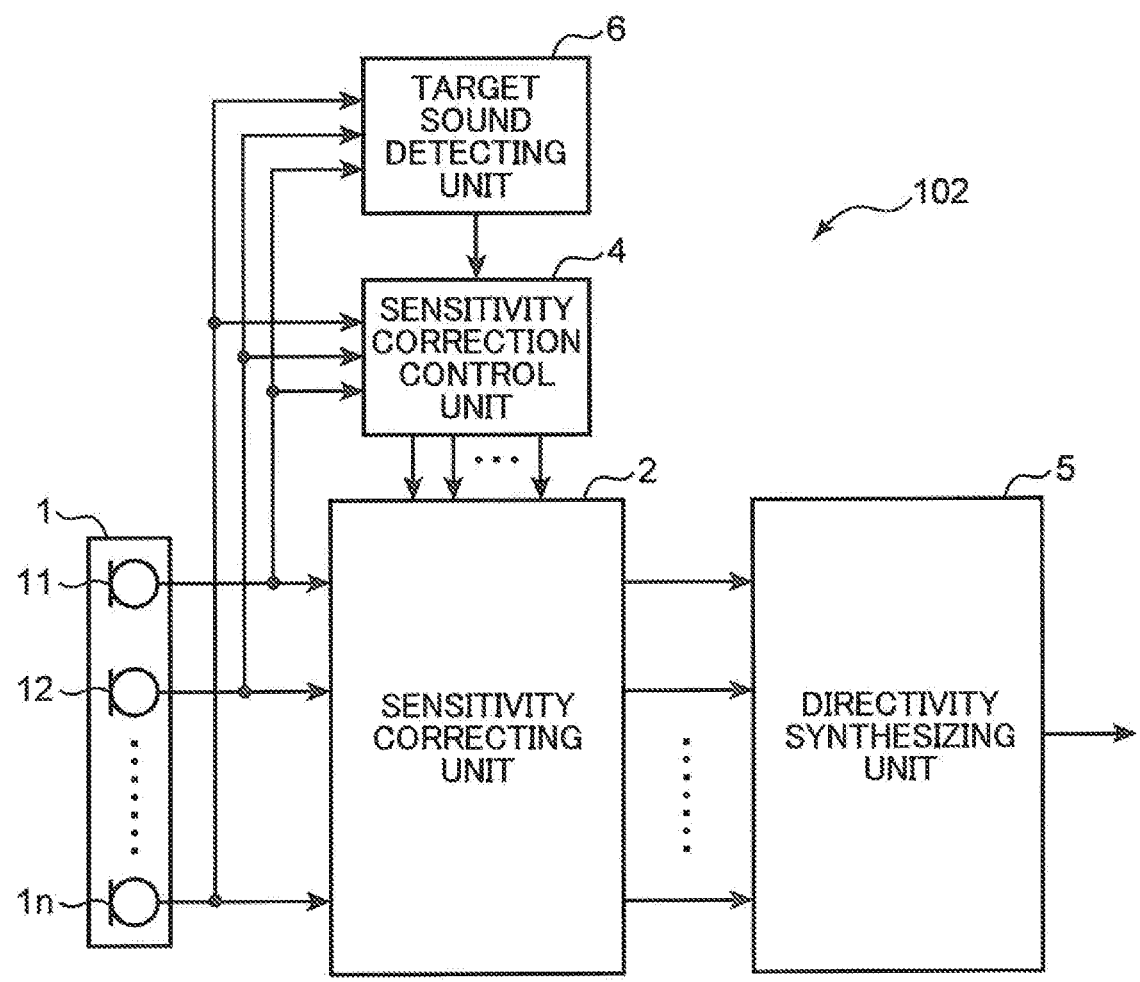
FIG. 8 is a block diagram illustrating a configuration of a sound pickup device according to a second embodiment of the present disclosure.

FIG. 8 is a block diagram illustrating a configuration of a sound pickup device 102 according to the second embodiment of the present disclosure.

The sound pickup device 102 illustrated in FIG. 8 includes a microphone array 1, a sensitivity correcting unit 2, a sensitivity correction control unit 4, a directivity synthesizing unit 5, and a target sound detecting unit 6. The difference from the sound pickup device 101 of the first embodiment is that the output signals from the plurality of microphone elements 11, 12, . . . , and 1n are input to the target sound detecting unit 6. In the second embodiment, the component configured the same as that of the first embodiment is appended with the same reference sign and description thereof is omitted.

Figure 9:
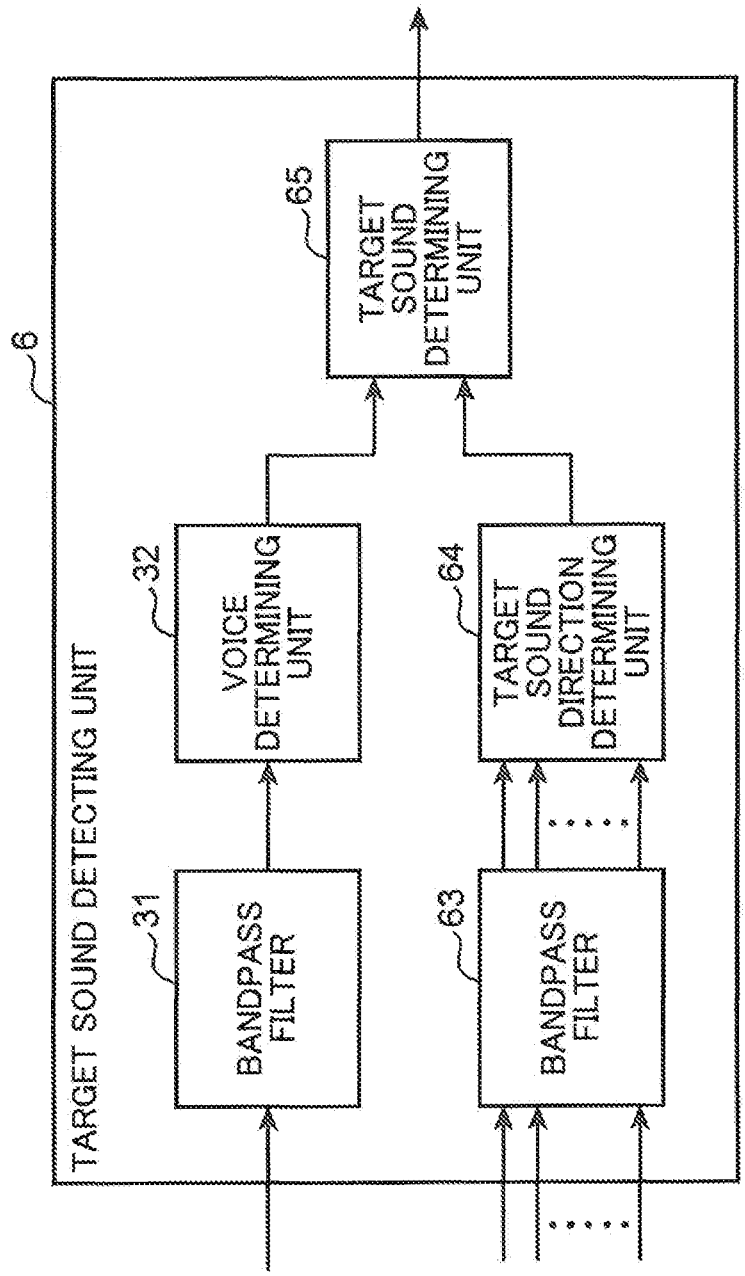
FIG. 9 is a block diagram illustrating a configuration of a target sound detecting unit of the sound pickup device according to the second embodiment of the present disclosure.

FIG. 9 is a block diagram illustrating a configuration of the target sound detecting unit 6 of the sound pickup device 102 according to the second embodiment of the present disclosure.

The target sound detecting unit 6 illustrated in FIG. 9 includes a bandpass filter 31, a voice determining unit 32, a bandpass filter (second extracting unit) 63, a target sound direction determining unit 64, and a target sound determining unit 65. Compared to the target sound detecting unit 3 of the first embodiment, the target sound detecting unit 6 of the second embodiment further includes the bandpass filter 63, the target sound direction determining unit 64, and the target sound determining unit 65.

The bandpass filter 63 extracts signals of a particular band from the output signals from the plurality of microphone elements 11, 12, . . . , and 1n. The bandpass filter 63 extracts signals of a band of, for example, 200 Hz to 500 Hz from the output signals from the microphone elements 11 to 1n.

The target sound direction determining unit 64 determines whether the target sound comes along a predetermined target sound direction using the output signals from the plurality of microphone elements 11, 12, . . . , and 1n. The target sound direction determining unit 64 determines whether the target sound comes along the target sound direction for the signals extracted by the bandpass filter 63. When the sound pickup device 102 disposed inside the vehicle to pick up a voice uttered by the driver, an angle at which the uttered voice of the driver enters the microphone array 1 is previously determined. For this reason, the target sound direction determining unit 64 previously stores an incident angle of the uttered voice. A configuration of the target sound direction determining unit 64 will be described further in detail using FIGS. 10 and 11.

The target sound determining unit 65 determines whether the target sound exists using two determined results by the voice determining unit 32 and the target sound direction determining unit 64. If the target sound direction determining unit 64 determines that the target sound comes along the target sound direction and the voice determining unit 32 determines that the output signal from one of the microphone elements 11, 12, . . . , and 1n is a voice, the target sound determining unit 65 determines that the target sound is detected. If the target sound direction determining unit 64 determines that the target sound comes not along the target sound direction or the voice determining unit 32 determines that the output signal from one of the microphone elements 11, 12, . . . , and 1*n* is not a voice, the target sound determining unit 65 determines that the target sound is not detected.

A configuration of the target sound direction determining unit 64 illustrated in FIG. 9 will further be described.

Figure 10:
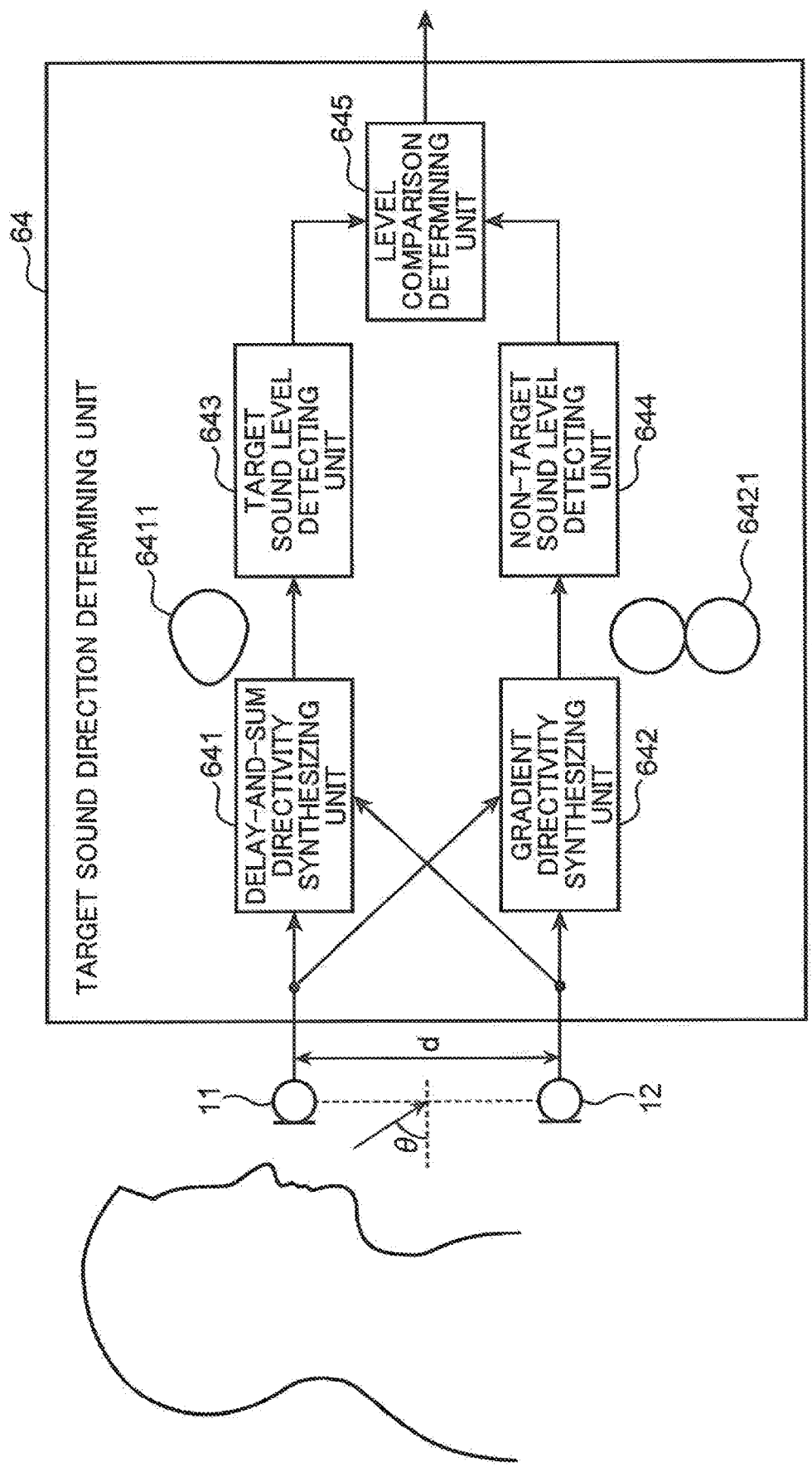
FIG. 10 is a block diagram illustrating a configuration of a target sound direction determining unit of the sound pickup device according to the second embodiment of the present disclosure.

FIG. 10 is a block diagram illustrating a configuration of the target sound direction determining unit 64 of the sound pickup device 102 according to the second embodiment of the present disclosure. For convenience of description on FIG. 10, an example where the output signals from two microphone elements 11 and 12 are input to the target sound direction determining unit 64 will be described.

The target sound direction determining unit 64 includes a delay-and-sum directivity synthesizing unit (delay-and-sum beamformer)(first directivity synthesizing unit) 641, a gradient directivity synthesizing unit (gradient beamformer) (second directivity synthesizing unit) 642, a target sound level detecting unit 643, a non-target sound level detecting unit 644, and a level comparison determining unit 645.

The delay-and-sum directivity synthesizing unit 641 boosts the signal coming along the target sound direction using the output signals from the plurality of microphone elements 11 to 1*n* to create directivity along the target sound direction. The delay-and-sum directivity synthesizing unit 641 has a high directivity along the target sound direction. The directional characteristic 6411 illustrated in FIG. 10 indicates a directional characteristic of the delay-and-sum directivity synthesizing unit 641. The directional characteristic 6411 of the delay-and-sum directivity synthesizing unit 641 is directed toward the target sound direction to boost the signal coming along the target sound direction.

The delay-and-sum directivity synthesizing unit 641 delays the output signal from the microphone element 11 by a path difference $\Delta$ ($\Delta = d \sin \theta$), where d is the distance between the microphone element 11 and the microphone element 12 and $\theta$ is an incident angle of the target sound direction. The delay-and-sum directivity synthesizing unit 641 adds together the delayed output signal from the microphone element 11 and the output signal from the microphone element 12. The distance d and the incident angle $\theta$ are previously stored in a memory (not shown).

The gradient directivity synthesizing unit 642 forms a sensitivity dead angle toward the target sound direction using the output signals from the microphone elements 11 and 12. A directional characteristic 6421 illustrated in FIG. 10 indicates a directional characteristic of the gradient directivity synthesizing unit 642. The directional characteristic 6421 of the gradient directivity synthesizing unit 642 has a dead angle toward the target sound direction and boosts a signal (noise) along a direction perpendicular to the target sound direction.

The gradient directivity synthesizing unit 642 delays the output signal from the microphone element 11 by a path difference $\Delta$ ($\Delta = d \sin \theta$), where d is the distance between the microphone element 11 and the microphone element 12 and $\theta$ is an incident angle of the sound coming along the target sound direction. The gradient directivity synthesizing unit 642 subtracts the output signal from the microphone element 12 from the delayed output signal from the microphone element 11. The distance d and the incident angle $\theta$ are previously stored.

The target sound level detecting unit 643 detects the output signal level of the delay-and-sum directivity synthesizing unit 641.

The non-target sound level detecting unit 644 detects the output signal level of the gradient directivity synthesizing unit 642.

The level comparison determining unit 645 compares the output level of the output signal from the delay-and-sum directivity synthesizing unit 641 with the output level of the output signal from the gradient directivity synthesizing unit 642 and determines whether the target sound comes along the target sound direction. The level comparison determining unit 645 compares the output signal level detected by the target sound level detecting unit 643 with the output signal level detected by the non-target sound level detecting unit 644 and determines whether the target sound comes along the target sound direction.

The delay-and-sum directivity synthesizing unit 641 has a directivity along the target sound direction. Thus, the speaker's voice, which is the target sound, is included in the output of the delay-and-sum directivity synthesizing unit 641. Meanwhile, the gradient directivity synthesizing unit 642 has a dead angle toward the target sound direction. Thus, the speaker's voice, which is the target sound, is hardly included in the output of the gradient directivity synthesizing unit 642. Accordingly, when the target sound comes along the target sound direction, the output signal level detected by the target sound level detecting unit 643 is large and the output signal level detected by the non-target sound level detecting unit 644 is small. The level comparison determining unit 645 determines that the target sound comes along the target sound direction if the output signal level detected by the target sound level detecting unit 643 (target sound level) is larger than the output signal level detected by the non-target sound level detecting unit 644 (non-target sound level).

Meanwhile, when the target sound comes not along the target sound direction, the outputs of the delay-and-sum directivity synthesizing unit 641 and the gradient directivity synthesizing unit 642 each includes only a surrounding noise. Accordingly, the output signal level detected by the target sound level detecting unit 643 is almost equal to the output signal level detected by the non-target sound level detecting unit 644, or is smaller than the output signal level detected by the non-target sound level detecting unit 644. The level comparison determining unit 645 determines that the target sound comes not along the target sound direction if the output signal level detected by the target sound level detecting unit 643 (target sound level) is equal to or smaller than the output signal level detected by the non-target sound level detecting unit 644 (non-target sound level).

In the first embodiment, it is determined that the target sound is detected if a voice is detected. Thus, even when utterance is made along a direction which is not the target sound direction, it is determined that the target sound is detected and sensitivity is corrected. In the second embodiment, it is determined that the target sound is detected only if a voice is detected and the target sound comes along the target sound direction. Thus, the sound pickup device 102 of the second embodiment can correct sensitivity using the target sound more accurately than the sound pickup device 101 of the first embodiment.

A configuration of the target sound direction determining unit according to an exemplary modification of the second embodiment will be described.

Figure 11:
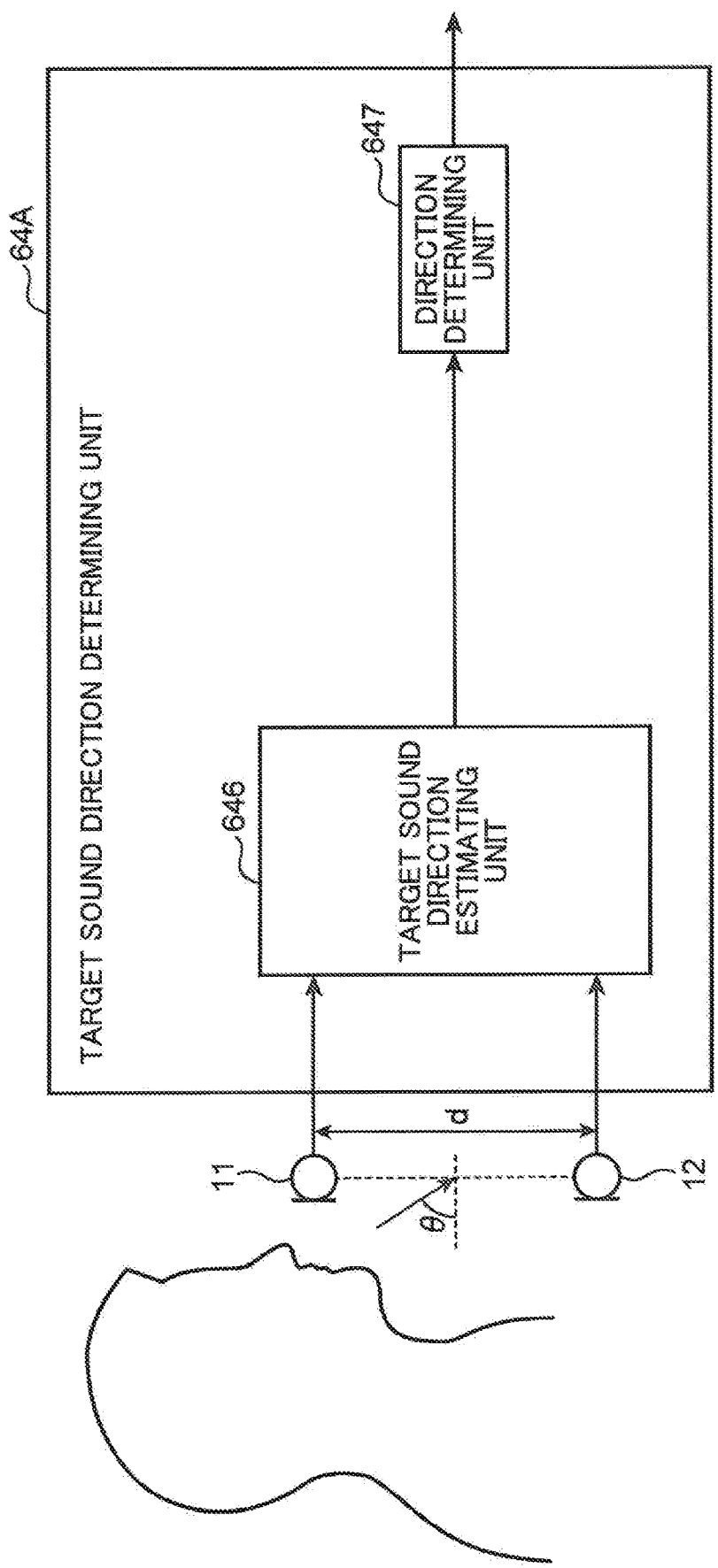
FIG. 11 is a block diagram illustrating a configuration of a target sound direction determining unit of the sound pickup device according to the second embodiment of the present disclosure.

FIG. 11 is a block diagram illustrating a configuration of a target sound direction determining unit of the sound pickup device according to an exemplary modification of the second embodiment of the present disclosure. For convenience of description on FIG. 11, an example where the output signals from two microphone elements 11 and 12 are input to a target sound direction determining unit 64A will be described. The target sound detecting unit 6 illustrated in FIG. 9 includes the target sound direction determining unit 64A illustrated in FIG. 11 in place of the target sound direction determining unit 64 illustrated in FIG. 9.

The target sound direction determining unit 64A includes a target sound direction estimating unit (direction estimating unit) 646, and a direction determining unit 647.

The target sound direction estimating unit 646 estimates the direction along which the target sound comes using a phase difference among the output signals of the plurality of microphone elements. A memory (not shown) previously stores a distance d between the microphone element 11 and the microphone element 12. The target sound direction estimating unit 646 estimates an incident angle θ of a sound coming along the target sound direction based on the phase difference between the microphone element 11 and the microphone element 12 and the distance d between the microphone element 11 and the microphone element 12.

The direction determining unit 647 determines whether the direction estimated by the target sound direction estimating unit 646 is a previously given target sound direction. The direction determining unit 647 determines that the target sound comes along the target sound direction if the direction estimated by the target sound direction estimating unit 646 is within a predetermined range including the previously stored target sound direction. The direction determining unit 647 determines that the target sound comes not along the target sound direction if the direction estimated by the target sound direction estimating unit 646 is not within the predetermined range including the previously stored target sound direction. For example, the direction determining unit 647 may determine whether the incident angle of the sound estimated by the target sound direction estimating unit 646 is within a range between −5 degrees and +5 degrees form a previously stored angle of the target sound direction. The memory (not shown) previously stores the angle of the target sound direction.

In the embodiment described above, each of the components of the embodiments may be a dedicated piece of hardware or each of the components may be implemented by executing a software program suitable for each component. Each of the components may be implemented by reading and executing a software program stored in a medium, such as a hard disk or a semiconductor memory, by a program executing unit, such as a central processing unit (CPU) or a processor.

A part or all of the functions of the device according to the embodiment of the present disclosure is typically implemented by a large scale integration (LSI), which is an integrated circuit. The functions may each be performed by a single chip or a part or all of the functions may be performed by a single chip. The integrated circuit is not limited to an LSI but may be implemented by a dedicated circuit or a general-purpose processor. A field programmable gate array (FPGA), which is an LSI programmable after having been manufactured, or a reconfigurable processor in which a connection or setting of a circuit cell inside the LSI is reconfigurable may be used.

A part or all of the functions of the device according to the embodiment of the present disclosure may be implemented by executing a program by a processor, such as a CPU.

Values used above are all exemplarily presented to specifically explain the present disclosure, so that the present disclosure is not limited by the exemplary values.

The order of executing the steps shown in the flowchart is an example for specifically explaining the present disclosure. As long as the same effect is obtained, the steps may be executed in an order other than the order described above. A portion of the step may be executed at the same time as the execution of (in parallel with) a different step.

The technique according to the present disclosure can improve the noise suppressing performance in the directivity synthesis and pick up the target sound with a high S/N ratio. The technique is therefore useful for picking up the target sound using a plurality of microphone elements.

This application is based on U.S. Provisional application No. 62/936,787 filed in United States Patent and Trademark Office on Nov. 18, 2019 and Japanese Patent application No. 2020-043913 filed in Japan Patent Office on Mar. 13, 2020, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A sound pickup device, comprising:
   a plurality of microphone elements;
   a sensitivity corrector configured to correct a difference in sensitivity among the plurality of microphone elements by multiplying an output signal of each of the plurality of microphone elements by a gain;
   a target sound detector configured to detect a voice of a speaker as a target sound;
   a gain controller configured to control the gain based on a result of detection by the target sound detector; and
   a directivity synthesizer configured to pick up the target sound that comes along a predetermined direction in a boosted manner using the output signal of each of the plurality of microphone elements and is corrected by the sensitivity corrector,
   wherein the gain controller updates the gain based on the output signal of each of the plurality of microphone elements when the voice of the speaker is detected by the target sound detector, and does not update the gain when the voice of the speaker is not detected by the target sound detector,
   the sensitivity corrector multiplies, when the gain is updated, the output signal by the updated gain to correct the difference in sensitivity among the microphone elements, and multiplies, when the gain is not updated, the output signal by the gain having been updated at the detection of the voice of the speaker to correct the difference in sensitivity among the microphone elements, and
   the target sound detector includes:
     a voice determiner configured to determine whether an output signal from one microphone element among the plurality of microphone elements is the voice or a non-voice that is not the voice;
     a storage configured to previously store a predetermined target sound direction along which the target sound enters the plurality of microphone elements;
     a target sound direction determiner configured to determine whether a direction along which the target sound comes is the predetermined target sound direction that is previously stored, using the output signal of each of the plurality of microphone elements; and a target sound determiner configured to determine that the target sound is detected when the target sound direction determiner determines that the direction along which the target sound comes is the predetermined target sound direction that is previously stored, and the voice determiner determines that the output signal from the one microphone element is the voice.

2. The sound pickup device according to claim 1, wherein the target sound detector includes a first extractor configured to extract a signal of a particular band from the output signal from the one microphone element, and the voice determiner determines whether the signal extracted by the first extractor is the voice or the non-voice.

3. The sound pickup device according to claim 1, wherein the target sound detector includes a second extractor configured to extract a signal of a particular band from the output signal of each of the plurality of microphone elements, and the target sound direction determiner determines whether the target sound comes along the target sound direction from the signal extracted by the second extractor.

4. The sound pickup device according to claim 1, wherein the target sound direction determiner includes a direction estimator configured to estimate a direction along which the target sound comes using a phase difference among the output signal of each of the plurality of microphone elements, and a direction determiner configured to determine whether the direction estimated by the direction estimator is the target sound direction which has previously been determined.

5. The sound pickup device according to claim 1, wherein the target sound direction determiner includes a first directivity synthesizer configured to form a directivity along the target sound direction by boosting a signal that comes along the target sound direction using the output signal of each of the plurality of microphone elements, a second directivity synthesizer configured to form a sensitivity dead angle toward the target sound direction using the output signal of each of the plurality of microphone elements, and a level comparison determiner configured to compare an output level of an output signal from the first directivity synthesizer with an output level of an output signal from the second directivity synthesizer and determine whether the target sound comes along the target sound direction.

6. The sound pickup device according to claim 1, wherein the gain controller includes a level detector configured to detect an output level of an output signal from each of the plurality of microphone elements, a time average level calculator configured to calculate a time average level of the output level detected by the level detector when the voice of the speaker is detected by the target sound detector, and a correction gain calculator configured to calculate a correction gain from the time average level calculated by the time average level calculator, the correction gain resulting from updating the gain.

7. The sound pickup device according to claim 6, wherein the correction gain calculator is configured to calculate the correction gain of each of the plurality of microphone elements, except a previously designated microphone element, using the time average level of the previously designated microphone element as a reference so that the time average level of each of the plurality of microphone elements, except the previously designated microphone element, are leveled to the time average level of the previously designated microphone element.

8. The sound pickup device according to claim 6, wherein the correction gain calculator is configured to calculate the correction gain of each of the plurality of microphone elements using an average of the time average levels of at least two previously designated microphone elements among the plurality of microphone elements as a reference, so that the time average levels of the plurality of microphone elements are leveled to the average of the time average levels of the at least two microphone elements.

9. The sound pickup device according to claim 6, wherein the gain controller includes a third extractor configured to extract a signal of a particular band from the output signal from each of the plurality of microphone elements, and the level detector detects output levels of the signals extracted by the third extractor.

10. The sound pickup device according to claim 9, wherein the particular band is from 200 Hz to 500 Hz.

11. A sound pickup method performed by a computer, the sound pickup method comprising:

correcting a difference in sensitivity among a plurality of microphone elements by multiplying an output signal of each of the plurality of microphone elements by a gain;

detecting a voice of a speaker as a target sound;

controlling the gain based on a result of detecting the target sound; and picking up the target sound in a boosted manner using the output signal of each of the plurality of microphone elements that is corrected, the target sound coming along a predetermined direction, wherein the controlling the gain is performed such that the gain is updated based on the output signal of each of the plurality of microphone elements when the voice of the speaker is detected, and the gain is not updated when the voice of the speaker is not detected, the correcting the difference in sensitivity is performed such that the output signal is multiplied, when the gain is updated, by the updated gain to correct the difference in sensitivity among the microphone elements, and the output signal is multiplied, when the gain is not updated, by the gain having been updated at the detection of the voice of the speaker to correct the difference in sensitivity among the microphone elements, and the detecting the target sound is configured to:

determine whether an output signal from one microphone element among the plurality of microphone elements is the voice or a non-voice that is not the voice, determine whether a direction along which the target sound comes is a predetermined target sound direction along which the target sound enters the microphone elements, using the output signal of each of the plurality of microphone elements, the predetermined target sound direction being previously stored in a storage, and determine that the target sound is detected when the direction along which the target sound comes is determined to be the predetermined target sound direction that is previously stored, and the output signal from the one microphone element is determined to be the voice.

12. A non-transitory computer readable recording medium storing a sound pickup program for causing a computer to function as:
 a sensitivity corrector configured to correct a difference in sensitivity among a plurality of microphone elements by multiplying an output signal of each of the plurality of microphone elements by a gain;
 a target sound detector configured to detect a voice of a speaker as a target sound;
 a gain controller configured to control the gain based on a result of detection by the target sound detector; and
 a directivity synthesizer configured to pick up the target sound in a boosted manner using the output signal of each of the plurality of microphone elements that is corrected by the sensitivity corrector, the target sound coming along a predetermined direction,
 wherein the gain controller updates the gain based on the output signal of each of the plurality of microphone elements when the voice of the speaker is detected by the target sound detector, and does not update the gain when the voice of the speaker is not detected by the target sound detector,
 the sensitivity corrector multiplies, when the gain is updated, the output signal by the updated gain to correct the difference in sensitivity among the microphone elements, and multiplies, when the gain is not updated, the output signal by the gain having been updated at the detection of the voice of the speaker to correct the difference in sensitivity among the microphone elements, and
 the target sound detector includes:
  a voice determiner configured to determine whether an output signal from one microphone element among the plurality of microphone elements is the voice or a non-voice that is not the voice;
  a storage configured to previously store a predetermined target sound direction along which the target sound enters the plurality of microphone elements;
  a target sound direction determiner configured to determine whether a direction along which the target sound comes is the predetermined target sound direction that is previously stored, using the output signal of each of the plurality of microphone elements; and
  a target sound determiner configured to determine that the target sound is detected when the target sound direction determiner determines that the direction along which the target sound comes is the predetermined target sound direction that is previously stored, and the voice determiner determines that the output signal from the one microphone element is the voice.

\* \* \* \* \*